United States Patent [19]

Horne et al.

[11] Patent Number: 5,670,470
[45] Date of Patent: Sep. 23, 1997

[54] PERCARBONATE STABILISED BY COATING WITH AN AQUEOUS SOLUTION OF PHOSPHATE AND BORON COMPOUNDS

[75] Inventors: Graham Robert Horne, Warrington; Alun Pryce James, Blundellsands, both of England

[73] Assignee: Solvay Interox Limited, Warrington, England

[21] Appl. No.: 464,662

[22] PCT Filed: Dec. 15, 1993

[86] PCT No.: PCT/GB93/02552

§ 371 Date: Jun. 21, 1995

§ 102(e) Date: Jun. 21, 1995

[87] PCT Pub. No.: WO94/14702

PCT Pub. Date: Jul. 7, 1994

[30] Foreign Application Priority Data

Dec. 23, 1992 [GB] United Kingdom ............. 9226797

[51] Int. Cl.⁶ ............ C01B 15/10; C11D 3/06; C11D 3/39; C11D 17/06

[52] U.S. Cl. .......... 510/375; 423/271; 423/415.2; 427/212; 427/213; 427/215

[58] Field of Search ............. 252/95, 99, 186.27, 252/174.13; 423/415.2, 271; 427/212, 213, 215; 510/375

[56] References Cited

U.S. PATENT DOCUMENTS

| | | | |
|---|---|---|---|
| 4,179,394 | 12/1979 | Dillenburg | 252/99 |
| 4,321,301 | 3/1982 | Brichard | 428/403 |
| 5,366,655 | 11/1994 | Yamashita | 252/186.27 |

FOREIGN PATENT DOCUMENTS

| | | | |
|---|---|---|---|
| 57-77006 | 5/1982 | Japan | 423/415.2 |
| 60-11210 | 1/1985 | Japan | 423/415.2 |
| 60-96511 | 5/1985 | Japan | 423/415.2 |

*Primary Examiner*—Dennis Albrecht
*Attorney, Agent, or Firm*—Larson and Taylor

[57] ABSTRACT

A process for stabilising percarbonate by coating with a coating agent. The percarbonate particles are treated with a concentrated aqueous solution containing at least one boron compound selected from the metal and ortho boric acids and at least one phosphate. Water is removed to provide the coated percarbonate particles which are useful in bleaching and washing compositions.

16 Claims, No Drawings

PERCARBONATE STABILISED BY COATING WITH AN AQUEOUS SOLUTION OF PHOSPHATE AND BORON COMPOUNDS

The present invention relates to a process for stabilising alkali metal percarbonates by coating particles of alkali metal percarbonates, coated alkali metal percarbonates thus obtained and washing or bleaching compositions containing such particles.

It is well known that percarbonates can be used as bleaching compounds in detergent powder mixtures. Compared with perborate tetrahydrate, they have the advantage of dissolving more rapidly at 20° C. Another advantage of the percarbonates is that they are environmentally friendly. However, the said percarbonates have the drawback of decomposing in the powdered state, particularly if stored in a damp atmosphere. Moreover, the other constituents of washing compositions can accelerate their decomposition.

In order to improve the stability of percarbonates, it has been proposed to coat the percarbonate particles with different types of coating agents. Organic and/or polymer compounds such as paraffin's, polyols, vinyl resins etc. and inorganic compounds such as silicates, borates, perborates, boric acids etc. have been proposed as coating agent.

A French patent published under number 2 528 447 describes coating the surface of sodium percarbonate with sodium borate. A process for coating sodium percarbonate consists of wetting the sodium percarbonate with water, mixing the damp sodium percarbonate with sodium borate in powder form and then drying them at a temperature above the melting temperature of the sodium borate used. This process requires a substantial amount of energy because of the high temperature required to melt sodium borates. In addition, the fact that the sodium percarbonate needs to be wetted requires strict control of its water content to prevent its decomposition.

Another coating method is described in British patent 1 575 792. This patent describes spraying boric acid solutions onto percarbonate particles or otherwise bringing them into contact. However, the solubility of boric acids in water is limited, particularly at ambient temperatures. Such low concentrations are disadvantageous for industrial use from the economic point of view because a large input of thermal energy is necessary to dry the percarbonate particles after spraying and because of the prolonged drying periods which cause a reduction in the active oxygen content of the percarbonate as a result of its decomposition.

It is an object of the present invention to provide a process for stabilising percarbonate particles which ameliorates or overcomes the disadvantages of the above-mentioned processes. It is an object of at least some embodiments of the present invention to obtain a homogeneous coating of the percarbonate particles and to obtain in this way an alkali metal percarbonate which is particularly stable in the presence of the other constituents of detergent powders without, however, reducing to a substantial or significant extent its active oxygen content.

It is a further object of some or further embodiments of the present invention to enable the use of aqueous mixed solutions of boric acid and a phosphate which are sufficiently concentrated to encourage industrial application.

The present invention relates to a process for stabilising particles of alkali metal percarbonate by coating by means of a coating agent, characterised in that the percarbonate particles are brought into contact with a concentrated aqueous solution of the coating agent containing at least one boron compound selected among the meta and orthoboric acids and at least one phosphate and thereafter dried or permitted to dry.

The proportion of boron compound used in the coating agent is generally 5 to 85% by weight calculated as $H_3BO_3$, based on the total weight of the coating agent. The best results are obtained when the proportion of boron compound is 30 to 80% by weight. Preferably, a proportion selected in the range of 50 to 80% by weight, based on the weight of the coating agent, are used.

The best results are obtained when the coating agent contains at least one boron compound selected from ortho and metaboric acids and at least one phosphate selected from the alkali metal, alkaline earth metal, earth metal and ammonium phosphates and the mixtures thereof.

The alkali metal, alkaline earth metal, earth metal and ammonium phosphates are generally selected from the orthophosphates, pyrophosphates, tripolyphosphates, trimetaphosphates, tetrametaphosphates, tetrapolyphosphates, dimeric phosphorus pentoxides, hexametaphosphates, polymetaphosphates and mixtures of two or more thereof. Good results are obtained with alkali metal, alkaline earth or ammonium phosphates and the mixtures thereof.

The phosphates used in the coating agent are preferably selected from sodium, potassium and ammonium phosphates and the mixtures thereof.

Particularly preferred phosphates used in the coating which are sodium orthophosphates selected from tribasic sodium phosphate, disodium hydrogen phosphate, sodium dihydrogen phosphate and mixtures thereof.

The proportion of phosphate used in the coating agent is generally 15 to 95% by weight, based on the total weight of the coating agent. The best results are obtained when the proportion of phosphate is 20 to 70% by weight. Preferably, a proportion selected in the range of 20 to 50% by weight, based on the weight of the coating agent, is used.

In practice, the concentration of coating agent, ie the total of phosphate and boron compound and any optional other constituent, in the aqueous coating solution is at least half of, and preferably as close as possible to, its saturation concentration of the solution at the application temperature. In this way, a smaller and preferably the smallest possible quantity of water needs to be evaporated subsequently to produce dry percarbonate particles, and thereby requiring least heat input. The concentration of coating agent in the aqueous coating solution is generally at least 15 % by weight, preferably at least 20% by weight. Concentrations above or equal to approximately 25% by weight are particularly advantageous.

The dissolution of the constituents of the coating agent can take place either by dissolving boric acid in an aqueous solution containing the phosphate or by dissolving the phosphate in an aqueous solution containing the boric acid. The dissolution can take place at a temperature of 15° to 95° C., preferably of 20° to 70° C.

The pH of the coating solution employing most of the phosphate/boric acid mixtures of the present invention is at least 6, and in many of such solutions, the pH is at least 7.

In addition, the coating agent may optionally contain other compounds that are likely to have a stabilising action on the percarbonates. Among these, the silicates can be used in particular. The silicates used in the coating agent are usually sodium silicates with a molar ratio of $Na_2O/SiO_2$ of 0.2 to 2.0 and preferably of 0.5 to 2.0. Good results have been obtained with sodium silicates chosen from sodium metasilicate, sodium orthosilicate, sodium sesquisilicate and mixtures of two or more thereof. Such silicates can be employed as such or formed by mixture of silicates containing a lower ratio of $Na_2O:SiO_2$ with soda.

The proportion of silicate used in the coating agent does generally not exceed 15 % by weight based on the total weight of the coating agent. The best results are obtained when the proportion of silicate does not exceed 3% by weight based on the weight of the coating agent.

In the case of a compound containing silicate, it can be incorporated within the coating solution. In this method of preparation, the boric acid is most preferably added to an aqueous solution containing the silicate, and the phosphate can either be present or be introduced subsequently.

The silicate-containing solution can also be contacted with the percarbonate particles as separate solution from the boric acid/phosphate solution. In such circumstances, the proportions of the silicate and mixed boric acid/phosphate are at the discretion of the user, the silicate often providing from 5 to 50% w/w of the total coating agent.

When the stabilised percarbonate particles according to the invention are coated with a compound containing silicate, the proportion of the boron compound used in the coating agent is generally 5 to 80% by weight, calculated as $H_3BO_3$ on the basis of the total weight of the coating agent. The best results are obtained when the quantity of boron compound amounts to 5 to 50% by weight. Preferably, quantities of 10 to 50% by weight of the coating agent are used.

In this same case, the proportion of phosphate used in the coating agent is generally 20 to 95% of the total weight of the coating agent. The best results are obtained when the proportion of phosphate is 40 to 95% by weight. Preferably, quantities of 40 to 90% by weight of the coating agent are used.

The quantity of coating agent used usually represents 0.5 to 20% by weight based on the weight of the coated percarbonate. Preferably, the quantity of coating agent used is selected in the range of from 1 to 15% by weight of the coated percarbonate. Quantities of from 2 to 15% coating agent based on the weight of the coated percarbonate give the best results.

The coated particles obtained according to the invention contain a relatively small quantity of coating agent which ensures a high active oxygen content at all times, ie does not significantly reduce the AvOx of the percarbonate as a result of applying a coating, and the presence of the coating subsequently enables the particles to retain Avox better than if no coating had been applied.

In some embodiments, the percarbonate particles are coated with a relatively small quantity of coating agent, such as from about 2% w/w to about 6% w/w, which ensures that the percarbonate particles initially can enjoy a high active oxygen content (Avox). In other embodiments, where the percarbonate is intended to be stored in an especially aggressive environment, such as alkaline detergent compositions containing a substantial proportion of aluminosilicate builders for use in hot and humid climates, it can be desirable to increase the total weight of coating to over 7% such as within the range of from about 7% to 12% w/w. The initial Avox of the percarbonate is lowered, but its ability to retain Avox is particularly good.

The alkali metal percarbonate is preferably sodium percarbonate.

The particulate percarbonate that is suitable for coating in any process according to the present invention can have been prepared in any process known as such for making an alkali metal percarbonate, e.g. by the direct method, by fluid bed processes, or the so-called wet processes in which percarbonate is crystallised from a saturated aqueous solutions, often by cooling and/or by addition of an alkali metal salt.

The percarbonate core particles which are coated by a process according to the present invention can incorporate various additives in a wide range of proportions and in accordance with known teachings and/or practice. Such additives include, amongst others, persalt stabilisers, crystal habit modifiers and salting out agents.

Persalt stabilisers can be selected from one or more of alkali metal and alkaline earth metal silicates, alkali metal and alkaline earth phosphates, magnesium compounds such as magnesium sulphate, chloride or oxide, organic complexing carboxylic acids and their salts, such as ethylene diamine tetraacetic acid and/or salt, or diethylenetriaminepentaacetic acid and/or salt and/or organic polyphosphonate complexing agents such as hydroxyethylidenediphosphonate, and alkyleneaminopolymethylenephosphonates, including ethylenediaminetetramethylenephosphonic acid (EDTMPA) and/or a soluble salt thereof, diethylenetriaminepentamethylenephosphonic acid (DTPMPA) and/or a soluble salt thereof, cyclohexane-1,2-diaminetetramethylenephosphonic acid (CDTMPA) and/or a soluble salt thereof.

In some highly desirable embodiments, the process of the present invention is employed to coat sodium percarbonate that has been produced by a manufacturing/stabilising process described either in British Patent Specification No 1 553 505 (A), published in the name of Interox Chemicals Limited or in British Patent Specification No 1 578 062 (A), published in the name of Peroxid-Chemie GmbH, in both of which the percarbonate contains a small amount of up to about 0.5% w/w silicate distributed within its particles and a further small amount of up to about 0.5% of a silicate or silicate derivative on the surface of its particles, as a result of the timing and distribution of the addition of silicate in two stages during the crystallisation and recovery of the particulate percarbonate.

Crystal habit modifiers act on the morphology of the percarbonate crystals and include organic polymeric compounds like polyacrylates and inorganic species such as polyphosphates eg sodium hexametaphosphate.

Salting out agents are used during the crystallisation of the percarbonate from solution in wet processes, and typically are highly water-soluble alkali metal salts, such as sodium chloride, sodium sulphate, and/or sodium hexametaphosphate.

It will be understood that some agents can simultaneously provide a number of different properties, Such as stabilisation and crystal habit modification. It will be further recognised that certain of the neutral salts employed in the present invention to improve the solubility of boric acid in the coating can be present also within the percarbonate core as a result of, for example, salting out operations.

The average diameter of the percarbonate particles to be coated is generally 100 to 2000 µm, preferably 200 to 1500 µm and in particular 250 to 1000 µm, such as commercially available percarbonate having an average particle size of about 500 µm or about 550 µm.

The spread of percarbonate particles is at the discretion of the percarbonate producer. As a practical matter, and as has been realised for many years, it is advantageous for incorporation in particulate detergent compositions to avoid very fine particles, sometimes referred to as fines, such as particles of below about 100 or 150 µm, because such particles are inherently more susceptible to environment—induced decomposition—they present a much higher surface area to volume ratio than larger particles. For many particulate detergent compositions, it is also desirable to avoid or minimise particles larger than about 1500 µm, to reduce potential problems of persalt/detergent particle segregation and to avoid excessively slow dissolutions rates. Thus, in many practical embodiments of the present invention all or substantially all the percarbonate to be coated can pass through a sieve of 1500 µm and be retained on a sieve of 150 µm, and in some of which or other embodiments at least 80% w/w is retained on a sieve of 350 µm and passes through a sieve of 1000 µm.

The process according to the present invention by which percarbonate particles are coated with the coating agent described above can comprise any method known in itself for contacting persalts with coating agent solution. A preferred means for bringing the coating agent into contact with the percarbonate comprises distributing an aqueous solution of the coating agent onto the percarbonate particles, for example by spraying. It is particularly desirable for the percarbonate particles to be kept in motion. Thus, a coating process of the present invention can desirably be carried out in a range of apparatuses that can agitate particles, of which practical examples include a fluid bed, a rotating plate, and a rotary mixer into each of which it is convenient to spray the coating agent solution. During the course of the contact, the persalt tends to adsorb, and to some extent absorb the coating agent solution and with subsequent or simultaneous evaporation of the solvent from the coating agent solution, a coating is deposited around the percarbonate core.

It will be recognised that the invention coating process may be conducted in a single pass through the coating apparatus or in a plurality of passes, at the discretion of the user. A plurality of passes, such as from 2 to 4 passes is particularly beneficial for application of a heavy coating, for example a total coating of around 10% w/w or more, in that it reduces the amount of solvent that need be removed in each pass and thus reduces or removes the risk of overwetting the percarbonate before it is dried. A continuous or batch method can be used.

An apparatus such as a fluid bed is particularly suitable for carrying out evaporation or simultaneous spraying and evaporation, In such a case, the temperature of the fluid bed is usually maintained in the range of 30° to 95° C. and preferably 60° to 80° C.

One particularly convenient process variation comprises spraying a solution of the invention coating agent in a separate mixer, particularly a rotary mixer, and drying of the wetted percarbonate subsequently in a fluid bed. In this variation, the temperature in the mixer is often selected in the range of 10° to 60° C. and preferably 20° to 50° C. Drying in the fluid bed is then conveniently carried out at a temperature of 50° to 90° C. and preferably of from 60° to 70° C. The process variation employing a mixer followed by a fluid bed drier is particularly suitable for a multi pass application of coating agent to percarbonate.

The fluid bed employed herein either for a combined coating/drying process or simply in the drying stage can be operated in accordance with known procedures for coating/drying or simply drying persalts, as the case may be. Thus, any non-reactive gas can be used as the fluidising gas, including air in particular. The gas can be pre-dehumidified, if desired, and pre-heated to maintain the temperature of the fluid bed at the desired value. It is also possible to use direct heating means for the fluidised bed, such as a tube bundle placed within the fluid bed or a heated jacket around the bed. The upward airflow of fluidising gas is regulated to maintain the percarbonate particles in an agitated state, ie not settling, but is not so great as to blow the particles, other than fines, out of the fluidising vessel.

The aqueous coating solution is generally brought into contact with the percarbonate particles at a temperature that is within about 30° C. of the particles and often within about 5° C. of each other, The proportions of coating agent solution and percarbonate are chosen so as to leave, after drying, the desired weight of coating agent around the percarbonate core. In practice, it is desirable to limit the addition of solution to percarbonate in a fluid bed or mixer to a maximum water content of about 18% w/w so as to minimise or eliminate wetting out problems, more preferably to an amount selected in the range of about 5 to 12% w/w water and often from about 8 to 12% w/w water. It is normally desirable also to continue drying until the coated percarbonate has a moisture content of below about 1% w/w, such as in the region of 0.1 to 0.7% w/w. The duration of the drying stage is usually determined by such practical considerations as, amongst others, the amount of coating agent solution being applied per unit weight of percarbonate, the residual content of moisture that will be tolerated, the temperature and moisture content of the influent fluidising gas, whether additional heating is employed for the bed and the rate at which the gas flows through the bed. It will accordingly vary from apparatus to apparatus and be capable of control by a skilled person in the art of coating persalts with the aid of preliminary ranging trials.

It will naturally be recognised that the final form of a coating agent on percarbonate may change as a result of subsequent reaction or processing. Thus, for example, contact of a solution of an acidic coating agent on the surface or in the surface layer of percarbonate, an alkali, as in the aforementioned British Patent Specification 1 575 792, may result in the interaction of the acid with the alkali, and that the drying stage can release water of hydration from some or all hydrated salts that might be expected to be present at ambient temperature, provided that the drying temperature exceeds the transition temperature for such salts. Accordingly, the present invention includes any coated percarbonate in which the coating agent has undergone any such processes in situ.

The present invention also relates to the coated percarbonate thus obtained.

The present invention also relates to washing or bleaching compositions containing particles of coated sodium percarbonate, such as those according to the present invention described hereinabove and/or produced by the process according to the present invention hereinabove.

In many preferred compositions according to the present invention, one or more of the composition components are selected within the following narrower bands:

percarbonate 2 to 40%, particularly 5 to 30% surfactant 2 to 40%, particularly 5 to 25% builder 1 to 60%, particularly 5 to 40% diluent 1 to 70%, particularly 5 to 50% additives 1 to 10% in total.

The surfactants for incorporation in solid compositions of the present invention can be selected from particulate or flaky anionic, cationic, nonionic, zwitterionic, amphoteric and ampholytic surfactants and can be either natural soaps or synthetic. A number of suitable surfactants are described in chapter 2 of Synthetic Detergents by A. Davidsohn and B. M. Milwidsky (6th edition) published in 1978 by George Godwin Ltd and John Wiley & Sons, incorporated herein by reference. Without limiting to these surfactants, representative sub-classes of anionic surfactants are carboxylic acid soaps, alkyl aryl sulphonates, olefin sulphonates, linear alkane sulphonates, hydroxy-alkane sulphonates, long chain and OXO alcohol sulphates, sulphated glycerides, sulphated ethers, sulpho-succinates, alkane sulphonates, phosphate esters, sucrose esters and anionic fluorosurfactants; representative classes of cationic surfactants include quaternary ammonium or quaternary pyridinium salts containing at least one hydrophobic alkyl or aralkyl group, representative classes of nonionic surfactants include condensates of a long chain alkanol with either polyethylene oxides or with phenols, or condensates of long chain carboxylic acids or amines or amides with polyethylene oxide, and related compounds in which the long chain moiety is condensed with an aliphatic polyol such as sorbitol or condensation products of ethylene and propylene oxides or fatty acid alkanolamides and fatty acid amine oxides; representative classes of amphoteric/zwitterionic surfactants include sulphonium and phophonium surfactants, optionally substituted by an anionic solubilising group. The proportion of surfactant, expressed as a fraction of all the surfactant present is often from 2/10 to 9/10ths anionic, from 0 to 6/10ths nonionic, and from 0 to 3/10ths for the other surfactants.

Detergent builders that are suitable for inclusion in compositions according to the present invention include specifically alkali metal phosphates, particularly tripolyphosphate but also tetrapyrophosphate and hexametaphosphate, especially the sodium salt of each, alkali metal, preferably, sodium carbonate, alkali metal, preferably, sodium borates, and siliceous builders including clays like bentonite, zeolites such as X, Y and MAP zeolites (EP-A-0 552 053) and layered silicates such as the product available under the trade designation SKS6. The coatings achievable with the boric acid-containing agents of the present invention render sodium percarbonate that has been so coated at higher levels particularly suited to incorporation in the relative aggressive detergent compositions, ie those containing siliceous builders. Useful detergent compositions can also include organic chelating builders include nitrilotrisodium triacetate (NTA), EDTA, EDTMP and DTPMP. Such chelating builders can be employed in a relatively small amount as an augmenting builder and peroxygen stabiliser, such as of 1 to 10%.

The detergent compositions can also contain diluents, in an amount usually of not more than about 50% w/w. Such diluents include sodium and magnesium sulphate and are less favoured than previously by manufacturers of detergent compositions, who in recent years have promoted concentrated compositions.

Detergent compositions of the present invention can also contain other substances selected for dedicated purposes in detergent compositions, which in some instances are referred to collectively as detergent additives. Among such additives, the following can be mentioned: persalt activators, optical brighteners, foam inhibitors, enzymes, fading inhibitors and anti-redeposition agents, colorants, pH regulators. Such additives for incorporation in persalt-containing detergent compositions have been described in greater detail in Chapter 4 and exemplified in Chapter 7 of the aforementioned work by Davidsohn and Mildwidsky and are well known to skilled practitioners. Thus, for example, the bleach activator is typically a compound which generates a peroxyacid or an anion thereof by reaction with the percarbonate and is employed in a mole ratio of about 4:1 to 1:2 percarbonate:activator for monoactivating activators and proportionately for multiactivating activators. The range of activators a1 to a20 described by Solvay Interox Ltd in EP-A 0 565 017 can be employed herein, including TAED, SNOBS, sodium isononoyloxybenzenesulphonate, TAGU or sugar esters. Another type of activator for washing/ bleaching compositions comprises certain transition metal salts and/or complexes, for example certain manganese, cobalt, and titanium complexes, sometimes employed in conjunction with a calcium promoter, as described in European Patent Application-A-0 272 030. Commonly used optical brighteners include stilbene derivatives. Commonly used optical brighteners include stilbene derivatives. Common antiredeposition agents include carboxymethyl cellulose and polyvinyl pyrrolidone, The washing and/or bleaching compositions can be employed for washing and or bleaching operations, such as for domestic laundry in accordance with currently described operation conditions for persalt containing compositions.

The use of the percarbonate particles coated according to the invention in washing and bleaching compositions is particularly indicated due to the improved stability of the coated percarbonate in the presence of other constituents of the washing powders; no substantial reduction in its active oxygen content has been observed and its bulk density as well as its rate of dissolution in the washing medium are appropriate. The bulk density of the percarbonate coated according to the invention is generally 0.8 to 1.2. The rate of dissolution of the percarbonate coated according to the invention is determined according to international standard ISO 3123-1976. The time corresponding to a 90% dissolution of the sample of percarbonate coated according to the invention does generally not exceed 2.5 minutes.

Certain embodiments of the present invention are described hereinafter in greater detail by way of illustration only and do not represent any restriction. The Examples given below demonstrate the remarkable results obtained as a result of the present invention.

Any and all processes, products and compositions described in Examples 1 to 6, 8 to 12, 14 and 15 are according to the invention and the products in comparisons C7 and C13 are provided for comparative purposes only.

EXAMPLE 1

200 g orthoboric acid ($H_3BO_3$) were added with agitation to 1000 g demineralised water, followed by 50 g sodium phosphate ($Na_3PO_4$).

The pH of the solution measured by means of pH indicator paper was approx. 7.

The solution was heated to 50° C. and then agitated for a further 5 minutes at this temperature.

All the boric acid and sodium phosphate dissolved and remained in solution immediately after cooling of the solution to ambient temperature, though some precipitation was observable after prolonged storage at ambient.

EXAMPLE 2

200 g orthoboric acid ($H_3BO_3$) were added with agitation to 1000 g demineralised water, followed by 100 g sodium phosphate ($Na_3PO_4$).

The solution was heated to 40° C. and then agitated for a further 5 minutes at this temperature.

All the boric acid and sodium phosphate dissolved and remained in solution even after cooling of the solution to ambient temperature.

The pH of the solution determined by means of pH indicator paper was 8.

EXAMPLE 3

125 g orthoboric acid ($H_3BO_3$) were added with agitation to 750 g demineralised water, followed by 125 g sodium phosphate ($Na_3PO_4$).

The solution was heated to 45° C. and then agitated for a further 5 minutes at this temperature.

All the boric acid and sodium phosphate dissolved and remained in solution even after cooling of the solution to ambient temperature.

The pH of the solution measured by means of pH indicator paper was approx. 8 to 9.

EXAMPLE 4

187.5 g orthoboric acid ($H_3BO_3$) were added with agitation to 750 g demineralised water, followed by 62.5 g sodium phosphate ($Na_3PO_4$). The solution was heated to 50° C. and then agitated for a further 5 minutes at this temperature. The pH of the solution measured by means of pH indicator paper was approx. 7 to 8.

All the boric acid and sodium phosphate dissolved and remained in solution even after cooling of the solution to ambient temperature.

EXAMPLE 5

200 g orthoboric acid ($H_3BO_3$) were added with agitation to 1000 g demineralised water, followed by 100 g sodium hydrogen phosphate ($Na_2HPO_4$).

The pH of the solution measured by means of pH indicator paper was approx. 6 to 7.

The solution was heated to 45° C. and then agitated for a further 5 minutes at this temperature.

All the boric acid and sodium phosphate dissolved and remained in solution immediately after cooling of the solution to ambient temperature, but some precipitation was observed after prolonged storage at ambient temperature.

EXAMPLE 6

200 g orthoboric acid ($H_3BO_3$) were added with agitation to 1000 g demineralised water, followed by 75 g sodium hydrogen phosphate ($Na_2HPO_4$).

The pH of the solution measured by means of pH indicator paper was approx. 6.

The solution was treated to 60° C. and then agitated for a further 5 minutes at this temperature.

All the boric acid and sodium phosphate dissolved and remained in solution even after cooling of the solution to ambient temperature.

Comparison C7

The AvOx content, rate of dissolution, bulk density and short-term storage characteristics were measured of an uncoated sodium percarbonate (Grade A) feed stock produced in a commercial process by precipitation from aqueous solution. These characteristics are summarised in Table 1 below. Further samples of this percarbonate feed stock were employed in the following Examples 8 to 12.

EXAMPLE 8

1 kg sodium percarbonate particles were coated by a batchwise process in a fluid bed fluidised with preheated air. The temperature of the fluid bed was maintained at 70° C. by an updraft of pre-heated air. The solution of coating agent introduced into the bed over 45 minutes comprised 211 ml of the 20% by weight solution containing boric acid and sodium phosphate prepared in Example 1. The percarbonate particles were simultaneously dried in the bed.

After the coating agent had been completely introduced, the dried coated percarbonate particles were removed from the fluid bed.

The characteristics of the coated product obtained in this Example are summarised in Table 1 below.

EXAMPLE 9

The process of Example 8 was repeated except that the coating solution comprised 175 ml of the 23% by weight solution containing boric acid and sodium phosphate prepared in Example 2.

After the coating agent had been completely introduced, the dried coated percarbonate particles were removed from the fluid bed.

The characteristics of the coated product obtained in this Example are summarised in Table 1 below.

EXAMPLE 10

The process of Example 8 was repeated except that the coating solution comprised 175 ml of the 23% by weight solution containing boric acid and sodium hydrogen phosphate prepared in Example 5.

After the coating agent had been completely introduced, the dried coated percarbonate particles were removed from the fluid bed.

The characteristics of the coated product obtained in this Example are summarised in Table 1 below.

EXAMPLE 11

The process of Example 8 was repeated except that the coating solution comprised 191 ml of the 22% by weight solution containing boric acid and sodium hydrogen phosphate prepared in Example 6.

After the coating agent had been completely introduced, the dried coated percarbonate particles were removed from the fluid bed.

The characteristics of the coated product obtained in this Example are summarised in Table 1 below.

EXAMPLE 12

In this Example, the coating was carried out in two stages. In the first stage, the coating process of Example 8 was repeated, ie 211 ml of the 20% by weight solution containing boric acid and sodium phosphate prepared in Example 1 was introduced over 45 minutes. Then, in the second stage 35 ml of a 22% by weight solution containing sodium silicate ($Na_2O.2SiO_2$) was introduced over 10 minutes.

After both coating agent had been completely introduced, the dried coated percarbonate particles were removed from the fluid bed.

The characteristics of the coated product obtained in this Example are summarised in Table 1 below.

Comparison 13

In this Comparison, the product characteristics of a second sodium percarbonate feed stock were tested and summarised in Table 1 below. The feed stock was made by the same commercial process as that tested in Comparison 7, but at a different time. This feed stock was employed for Examples 14 and 15 below.

EXAMPLE 14

The process of Example 8 was repeated except that the coating solution comprised 211 g of the 25% by weight solution containing boric acid and sodium phosphate prepared in Example 3.

After 30 minutes coating, the dried coated percarbonate particles were removed from the fluid bed.

The characteristics of the coated product obtained in this Example are summarised in Table 1 below.

EXAMPLE 15

The process of Example 8 was repeated except that the coating solution comprised 21 1 g of the 25% by weight solution containing boric acid and sodium phosphate prepared in Example 4.

After 30 minutes coating, the dried coated percarbonate particles were removed from the fluid bed.

The characteristics of the coated product obtained in this Example are summarised in Table 1 below.

In Table 1, the characteristics have the following meanings:

(1) % by weight coating agent based on the weight of the coated percarbonate (2) The active oxygen content (AvOx) is determined by the method of $KMnO_4$ titration.

(3) T90 corresponds to the time required for dissolving 90% of a sample of sodium percarbonate in demineralised water at 15° C., determined according to the international standard ISO 3123-1976.

(4) The stability of the sample is determined by comparing its active oxygen content after 48 hours storage under standardised conditions with the initial active oxygen content. The standardised conditions are:

the sample of sodium percarbonate (90 parts w/w) was mixed with zeolite 4A (10 parts w/w) and stored in a polyethylene vial fitted with a lid having a pinhole vent and the sample was kept at 40° C. and a relative humidity of 80%.

TABLE I

| Ref | Coating Prep By | Coating % by wt (1) | Avox (2) | T90 (Min) (3) | Bulk Density | Stability % Retained (4) |
|---|---|---|---|---|---|---|
| C7 | — | — | 13.9 | 1.0 | 0.99 | 77 |
| Ex 8 | Ex 1 | 5% | 13.7 | 1.5 | 1.01 | 99 |
| Ex 9 | Ex 2 | 5% | 13.6 | 1.5 | 1.05 | 98 |
| Ex 10 | Ex 5 | 5% | 13.4 | 0.9 | 1.04 | 97 |
| Ex 11 | Ex 6 | 5% | 13.7 | 0.7 | 1.02 | 99 |
| Ex 12 | Ex 1 + silicate | 5% 0.7% | 13.6 | 1.1 | 1.04 | 99 |
| C13 | — | — | 13.8 | 1.1 | 1.02 | 77 |
| Ex 14 | Ex 3 | 5% | 12.9 | 0.9 | 0.99 | 98 |
| Ex 15 | Ex 4 | 5% | 13.3 | 1.3 | 1.06 | 96 |

Further trials were conducted to determine the acceptability of the products obtained in Examples 8 to 12, 14 and 15.

The suitability of coated percarbonate for bulk storage was tested by measuring its heat output using an LKB isothermal microcalorimeter and the results summarised in Table II below. The suitability of the coated percarbonate for incorporation with other ingredients in a washing or bleaching composition was determined by a more prolonged storage trial under the conditions specified for Table I with a detergent base composition which contained zeolite 4A and carbonate builders.

The results after 2 and 6 weeks storage are given in Table II below.

TABLE II

| Ref | Heat Generation LKB - 40° C. µW/g | AvOx Stability % AvOx Retention 2 weeks | 6 |
|---|---|---|---|
| C7 | 10 | 67 | 21 |
| Ex 8 | 10 | 90 | 71 |
| Ex 9 | 7 | 91 | 69 |
| Ex 10 | 9 | 88 | 76 |
| Ex 11 | 8 | 91 | 72 |
| Ex 12 | 9 | 94 | 66 |
| C13 | 6 | 71 | 39 |
| Ex 14 | 6 | 93 | 69 |
| Ex 15 | 7 | 92 | 67 |

From Table II, it can be seen that the coated percarbonate retained its good bulk storage stability and showed a markedly higher pack storage stability than the uncoated percarbonate feed stock material.

We claim:

1. A process for stabilising alkali metal percarbonate particles by coating by means of a coating agent which comprises:

contacting the percarbonate particles with an aqueous solution containing at least 15% by weight of a coating agent, said coating agent solution being prepared by dissolving at least one boric acid selected from the group consisting of metal and ortho boric acids and at least one phosphate selected from the group consisting of alkali metal, alkaline earth metal, and ammonium phosphates, the boric acid calculated as $H_3BO_3$ constituting from 5–85% by weight of the boric acid and phosphate, and the phosphate constituting from 15–95% by weight of the boric acid and phosphate; and removing water to provide a coating of the coating agent on the percarbonate particles, the amount of the coating agent being from 0.5 to 20% by weight based on the weight of the coated alkali metal percarbonate particles.

2. Process according to claim 1 wherein the alkali metal percarbonate comprises sodium percarbonate.

3. Process according to claim 1 wherein the phosphate is a phosphate selected from the group consisting of sodium, potassium, and ammonium phosphates and mixtures thereof.

4. Process according to any one of claims 1 to 3 wherein the coating agent further contains a maximum of 15% by weight, based on the total weight of the coating agent of a sodium silicate compound having a molar ratio of $Na_2O/SiO_2$ of 0.2 to 2.0.

5. Process according to any one of claims 1 to 3 wherein the aqueous solution of coating agent is employed at a concentration in the vicinity of its saturation concentration at the temperature of use.

6. Process according to claim 5 characterised in that the pH of the aqueous solution of coating agent is at least 6.

7. Process according to any one of claims 1 to 3 wherein said contacting is carried out by spraying the aqueous solution containing the constituents of the coating agent on to the percarbonate particles.

8. Process according to claim 7 wherein said spraying is carried out in a fluid bed.

9. Process according to claim 8 wherein the temperature of the fluid bed is 30° to 95° C.

10. Process according to any one of claims 1 to 3 wherein said contacting is carried out in a mixer and wherein said removing water is carried out by drying in a fluid bed.

11. Process according to claim 10 wherein the temperature in the mixer is from 10° to 60° C. and wherein the temperature of the fluid bed is from 50° to 90° C.

12. Process according to claim 1 wherein said boric acid is present in said aqueous solution in an amount of from 30 to 80% by weight calculated as $H_3BO_3$, based on the total amount of the boric acid and phosphate.

13. Process according to claim 1 wherein said boric acid is present in said aqueous solution in an amount of from 50 to 80% by weight calculated as $H_3BO_3$, based on the total amount of the boric acid and phosphate.

14. Process according to claim 12 wherein the amount of coating agent in said aqueous solution, is at least 20% by weight based on the weight of the solution.

15. Process according to claim 12 wherein the amount of coating agent in said aqueous solution is at least 25% by weight based on the weight of the solution.

16. Process according to any one of claims 12 to 15 wherein said contacting is carried out with said aqueous solution at ambient temperature.

* * * * *